C. H. IVERS.
IDENTIFICATION MEANS FOR COTTON BALES.
APPLICATION FILED JULY 22, 1907.
930,671. Patented Aug. 10, 1909.
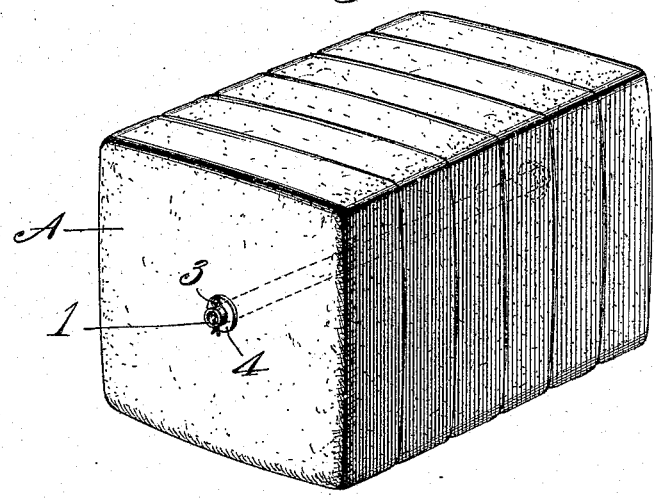
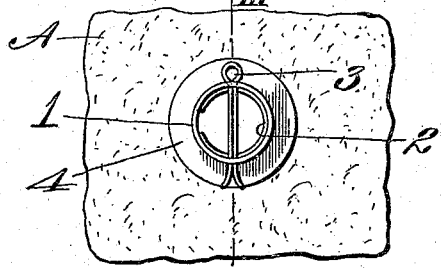
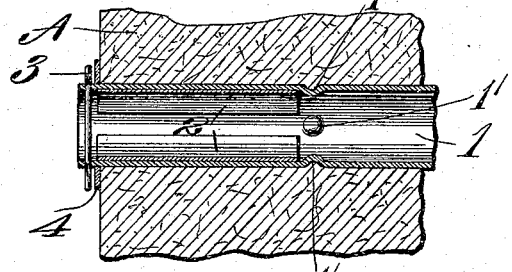
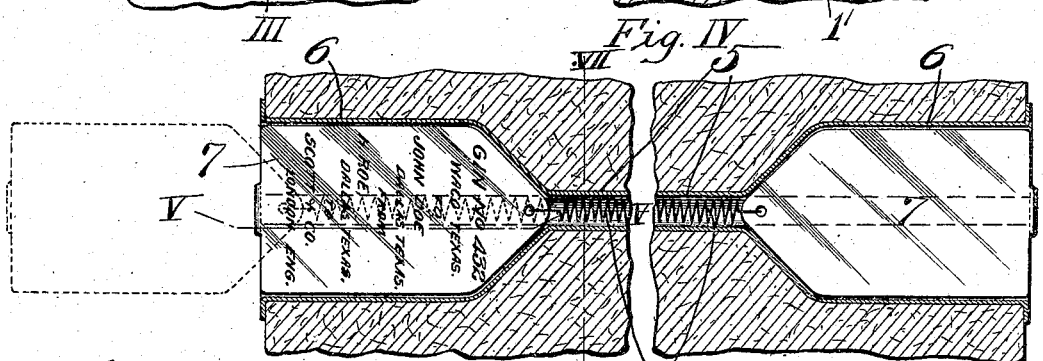
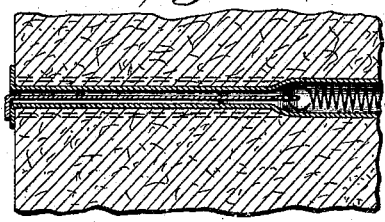
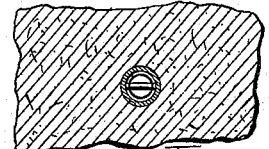
Inventor:
Chas. H. Ivers,
by Cartwright atty.

UNITED STATES PATENT OFFICE.

CHARLES H. IVERS, OF ST. LOUIS, MISSOURI.

IDENTIFICATION MEANS FOR COTTON-BALES.

No. 930,671.  Specification of Letters Patent.  Patented Aug. 10, 1909.

Application filed July 22, 1907. Serial No. 384,892.

*To all whom it may concern:*

Be it known that I, CHARLES H. IVERS, a citizen of the United States of America, and residing at the city of St. Louis, in the State of Missouri, have invented certain new and useful Improvements in Identification Means for Cotton-Bales, of which the following is a full, clear, and exact description, reference being had to the accompanying drawings, forming part of this specification.

My invention relates to means for application to cotton bales, whereby the particular bales to which the means has been applied may be determined in the event of the bales becoming destroyed by fire.

Heretofore there has been great contention between the owners of cotton shipped in bales, transportation companies, and insurance companies, when cotton has been destroyed by fire during transportation, and it is the object of my improvement to provide in connection with bales of the description mentioned, a non-combustible identification device which will not be destroyed when the bales of cotton are consumed by fire, but will remain in a condition to serve as evidence of ownership of the cotton and also where desired, as evidence of the origin of the cotton, the name of the consignee or consignees and any other information that may be desired to associate with the bales of cotton, previous to or during transportation. The means I employ also serves as one for the reception of shipping instructions to transportation companies.

A further object of my invention is to provide identification means and a carrier therefor so secured to or mounted in a bale of cotton that they will not be injured in the handling of the bale. In this connection attention is directed to the fact that cotton bales are ordinarily wrapped in bagging or other covering material and the identification marks are commonly painted or otherwise produced upon the covering or made upon tags attached to the covering and inasmuch as the bales are commonly handled by the use of hand hooks the covering bearing the identification marks or the tags becomes destroyed with the result of leading to numerous difficulties in the determination of the ownership or transportation instructions that should properly appear in connection with the cotton bales while they are in transit from one place to another or while they are in storage.

Figure I is a perspective view of a cotton bale, illustrating my improvement. Fig. II is an enlarged end elevation of the central portion of a bale, shown in Fig. I. Fig. III is a section on line III—III, of Fig. II. Fig. IV is a section through portions of a bale, and a modification of my identification means. Fig. V is a section taken on line V—V, Fig. IV. Fig. VI is an end elevation of the parts shown in Figs. IV and V. Fig. VII is a section on line VII—VII, Fig. IV.

A designates a bale of cotton, and in Figs. I to III of the drawings, 1 indicates a tube, which extends centrally through the bale from end to end or side to side and the end of which protrudes a short distance beyond the bale. This tube is designed to provide a carrier to receive a non-combustible shipping tag 2, preferably metallic, which is first rolled to a cylindrical shape and then placed within said tube, said tag being limited in its forward movement by bosses 1' extending inwardly from the wall of the tube 1 and being retained in place by a retaining means such as a cotter key 3. I prefer to arrange upon each end of the tube a washer 4 which is located between the bale and cotter key to prevent longitudinal movement of the tube in the bale.

In Figs. IV to VII inclusive, 5 designates a tube located in the center of the bale, and which has its ends spread out so as to provide enlarged pockets 6 which terminate at the outer faces of the bale. These pockets are each designed to receive a shipping tag 7 which are held in place in their respective pockets by means of a coiled draw spring 8, located in the tube 5 and secured to each of said tags 7. This mode of securing the tags 7 within the pockets affords ready means whereby the tags may be withdrawn for inspection or for the purpose of further addressing them, and insures their return to said pockets.

I claim:

1. The combination, with a bale; of a tube extending entirely through the bale so as to provide a carrier for an identification means, and means for retaining the identification means within the tube from forward movement.

2. The combination, with a bale; of a tube extending entirely through the bale and having its ends spread out so as to provide a carrier for identification means, an identification means, means for retaining the identification means within the tube from forward movement and a spring for connecting the identification means.

CHARLES H. IVERS.

In the presence of—
 LILY POST,
 WM. H. SCOTT.